Feb. 6, 1945. G. M. GRAHAM 2,368,757
TENSIOMETER
Filed July 1, 1943 2 Sheets-Sheet 2
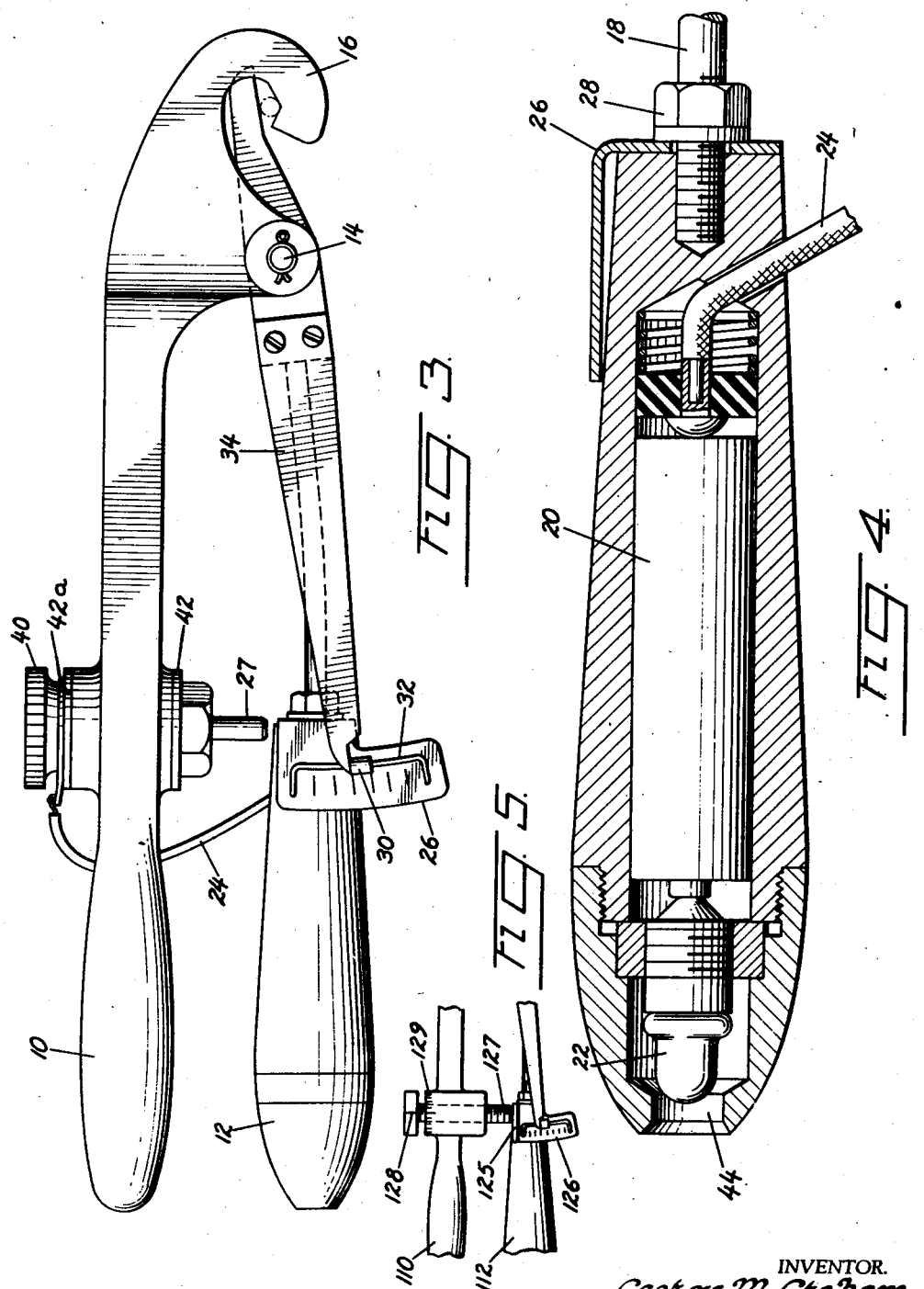
INVENTOR.
George M. Graham
BY
Parker & Benton
ATTORNEYS Patented Feb. 6, 1945

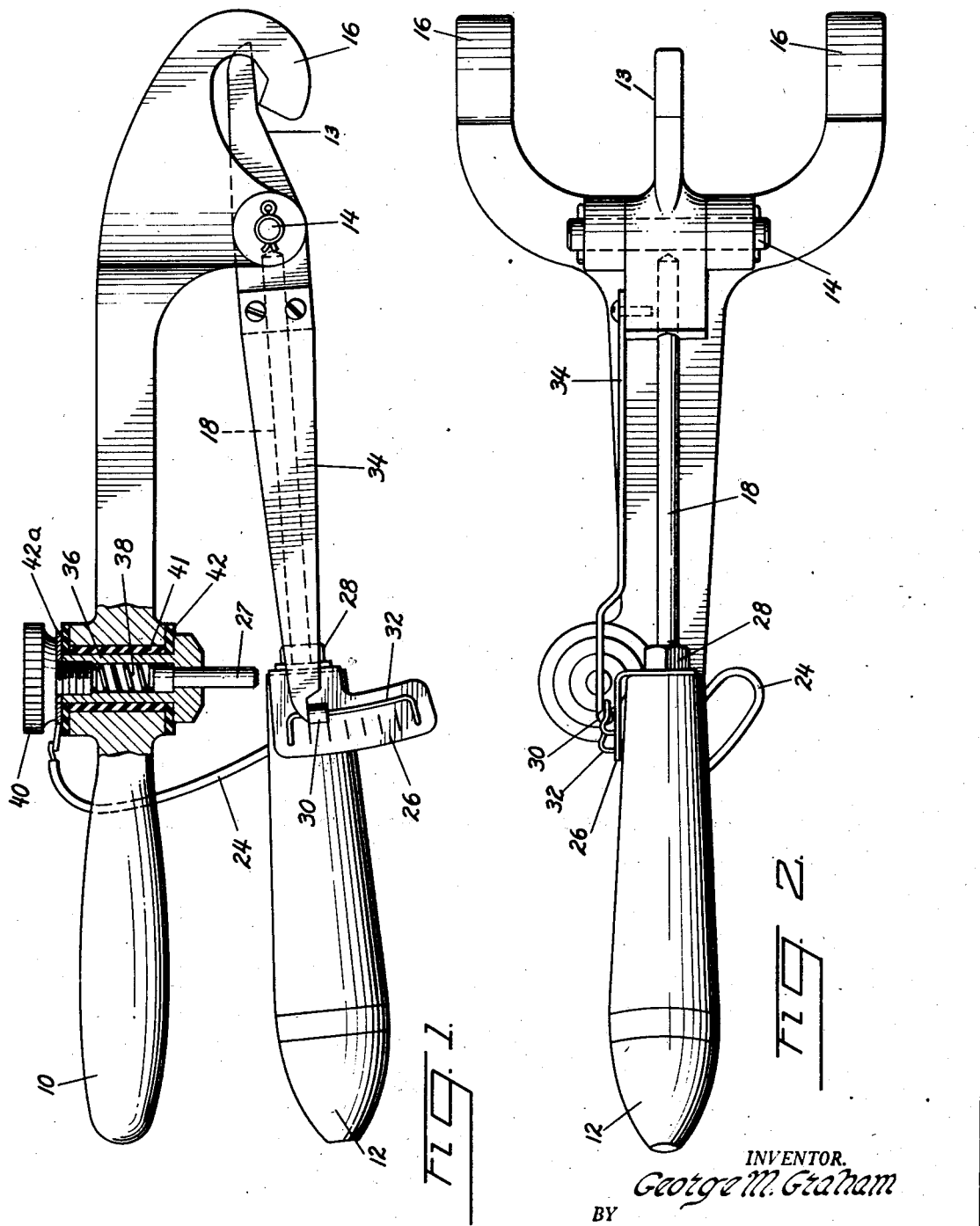

2,368,757

UNITED STATES PATENT OFFICE 2,368,757

TENSIOMETER

George M. Graham, Detroit, Mich., assignor to Hinckley-Myers Division of Kent-Moore Organization Inc., Jackson, Mich., a corporation of Michigan Application July 1, 1943, Serial No. 493,123

9 Claims. (Cl. 73—144)

This invention relates to an improved tensiometer. It is adapted particularly to measure the tension imposed upon a cable and is designed for use in servicing aircraft wherein cables commonly extend through enclosed portions of the machine and access thereto is through small openings which may not exceed four inches in diameter.

The instrument is so designed that it may be inserted through such an opening and the cable tension may be taken and the measurement thereof so indicated that when the instrument is released from the cable and withdrawn through the opening such indication will be retained for reading by the operator notwithstanding the fact that the instrument has been released from the cable.

In measuring the tension which has been imposed upon the cable it is the practice to flex a short section of the cable between two spaced supports. This practice is pursued in the use of the instant instrument. If this flexing exceeds a certain amount, a strain may be imposed upon the cable which may weaken it. It is therefore desirable that an indication be given by the instrument when this amount of flexing has occurred so that the cable will not be flexed beyond its safe limits.

One object of this instrument therefore is to indicate to the operator, even though the instrument may be engaged with the cable within the interior of an aircraft shell where the tension scale cannot be read, when the cable has been flexed to the permitted limit. This indication is given regardless of whether the cable is under a tension which is readable upon the tension scale of the instrument or not. The instrument therefore serves two purposes, namely: it indicates when a permitted maximum flexing has been imposed upon the cable and, further, it measures the tension which is imposed upon the cable being tested.

An object of the invention is to provide an instrument of this character, which is of a simple, rugged, inexpensive construction, which is easily operated, and which is sufficiently accurate for the purpose in question.

Generally, the instrument is in the form of a pair of pliers having cooperating cable engaging jaws. Each member of the pair has a jaw portion and a handle portion. These two members are pivoted together as is common in the construction of pliers. The handle portion of one jaw member is in the form of a tension rod or beam being similar to that used in the tension wrench. This tension beam is secured at one end to the jaw portion of the member and is provided at the opposite end with a hand grip portion. Means is provided to indicate the tension imposed upon the rod or beam in flexing the tensioned cable section between the jaws. Means is also provided to indicate when a cable is flexed between the jaws, regardless of the tension of such cable section, a determined distance.

Other objects, advantages and meritorious features of the invention will more fully appear from the following description, appended claims and accompanying drawings wherein:

Fig. 1 is a side elevation partially in section of the improved instrument embodying the invention.

Fig. 2 is a plan of the instrument taken at an angle of 90° to the view of Fig. 1.

Fig. 3 is an elevation taken from the same angle as Fig. 1, but showing the instrument in use and showing a reading indicated on the tension scale.

Fig. 4 is a section through the hand grip portion of one handle element.

Fig. 5 is a fragmentary view of a modification of the structure of Figs. 1 to 4.

The instrument comprises a pair of handle-like elements indicated generally as 10 and 12, and pivotally articulated together by a pivot pin 14. Each element is provided with a jaw portion. The jaw portion of the element 10 is bifurcated as shown in Fig. 2 providing a pair of cable-supporting parts 16, which are spaced on opposite sides of the jaw portion 13 of the element 12. These cable-supporting parts are hook-shaped as appears in Figs. 1 and 3 so that when a portion of a cable is supported therebetween such cable portion may be flexed by the cooperating jaw 13 and the handle element 12 as shown in Fig. 3.

The handle element 12 includes a tension bar 18 which is secured at one end to the hand grip portion and at the other end to the jaw portion 13 of the element as by welding, brazing or the like. This tension rod or beam is of the character of tension rods which are in use in tension wrenches.

The hand grip portion as shown in Fig. 1 is hollow and carries a flash light battery 20 and a flash light bulb 22. The bulb may be mounted in the metal hand grip in a manner well understood and the opposite terminal of the battery is connected with a lead wire 24 hereinafter described.

This hand grip carries a scale plate 26 which may be secured in place by a nut 28. This scale plate is provided with a tension reading scale which may be calibrated by test and so marked as to indicate tension in pounds or other desired units imposed upon the cable tensioned between the jaws of the instrument.

An indicator slide 30 is mounted upon a wire 32 which wire is carried by the scale plate and extends along the scale so that the indicator slide is frictionally held against the plate by the wire and will frictionally retain the position to which it is moved along the scale.

A pointer 34 is provided. This pointer is secured at one end to the jaw of the element which incorporates the tension bar as shown in Fig. 1. This may be secured by pins or it may be brazed in place. The opposite end of the pointer is adapted as shown in Figs. 1 and 3 to engage the indicator block 30 and to move it along the tension scale as shown in Figs. 1 and 3.

It is apparent that when the jaws of the instrument are engaged about a cable under tension and pressure is applied to the cable by the other jaw that as the cable is flexed the tension bar will yield while the pointer will move the indicator block along the scale to read the tension which resists the flexing. It is likewise apparent that the instrument may be inserted, as heretofore stated, into an enclosed space where the tension scale would not be visible to the operator and the tension of the cable may be measured and the instrument may then be removed from the cable and withdrawn from the space and the maximum tension measured may be read.

As heretofore set forth the instrument includes means whereby an indication as to the extent of flexing of a cable gripped between the jaws may be given regardless of the tension under which the cable may be. This indication is given by the electric light to which reference has heretofore been made. The lead wire 24 extends to a contact pin 27 carried by the jaw member 10. This contact pin is mounted within a bushing retainer 36 and is held to a seat therein by a spring 38 which is held in place by a removable screw cap 40. An insulating sleeve 41 and insulating gaskets 42 and 42—a are provided and the lead wire extends to form contact through the spring with the contact pin 27 so that when the pin engages the pointer 34 the circuit is closed through the light and battery. The end of the hand grip is open as at 44 so that when the circuit is closed and bulb illuminated an indication will be given to the operator that the cable section gripped between the jaws has been flexed to the maximum safe amount permitted by the setting of the contact pin. The contact pin would be set to the amount required to indicate the maximum permitted flexing of the particular character and diameter of cable being tested. It is apparent that contact pins of different lengths may be substituted so that a reading might be taken for a 1/8 inch diameter cable or a 1/4 inch diameter cable or of any size within the capacity of the instrument.

It is therefore apparent that when a cable section has been flexed between the jaws a determined distance an indication will be given by the light of such flexing and that this will be true regardless of whether the cable is under tension or slack. This indication is merely for the purpose of preventing flexing of the cable beyond its safe limit. It may occur upon a slack cable or it may result when a cable under tension is being tested. In either instance it is a warning signal.

In the modification shown in Figure 5 the device is illustrated as provided with an adjustable but positive stop pin adapted to limit the relative movement of the jaws in flexing a cable therebetween. Handle portion 110 is provided with a stop pin 127 adapted to engage a ledge 125 formed on scale plate 126 carried by handle portion 112 to limit the relative movement of the jaws in flexing a cable portion between the jaws. The stop pin is screw threaded within a boss on said handle portion 110. If there were forty thread turns to the inch, each complete revolution of the threaded stop would advance or withdraw the stop .025 of an inch.

The stop could be provided with an indication line 128 and the encircling boss with twenty-five spaced indicating marks 129 to register .001 of an inch movement of the stop pin.

In using the device, the stop would be so set that in testing a cable of any diameter its predetermined safe flexing is permitted. A cable 1/8 of an inch in diameter would require a setting of the stop pin different from that required for a different diameter cable.

Engagement of the projected end of the stop with the ledge 126 would not only indicate to the operator that the cable had been flexed its safe permitted limit but would positively prevent further flexing of the cable.

What I claim is:

1. An instrument of the class described comprising, in combination, a pair of handle elements pivoted together, each element having a jaw, one jaw having a pair of cable engaging parts spaced on opposite sides of the other jaw and cooperating therewith to flex the cable therebetween, the handle portion of one element including a tension bar portion, and means associated therewith to indicate the flexing thereof in flexing the cable under tension between the jaws.

2. An instrument of the class described comprising, in combination, a pair of handle elements pivoted together, each element having a jaw, one jaw having a pair of cable engaging parts spaced on opposite sides of the other jaw and cooperating therewith to flex the cable therebetween, the handle portion of one element including a tension bar secured at one end to the jaw of the element and having a hand grip portion mounted on its opposite end and a pointer extending parallel to said tension bar and secured at one end to said jaw and having its opposite end associated with means to indicate the flexing of the bar in flexing a cable portion tensioned between the jaws.

3. An instrument of the class described comprising, in combination, a pair of handle elements pivoted together, each element having a jaw, one jaw having a pair of cable engaging parts spaced on opposite sides of the other jaw and cooperating therewith to flex a cable therebetween, the handle portion of one element including a tension bar secured at one end to the jaw of the element and having a hand grip portion mounted on its opposite end, said hand grip being provided with a scale, a pointer extending parallel to the tension bar and secured at one end to the jaw of the same element and having its opposite end adapted to travel over said scale as the tension bar is flexed, to indicate the tension imposed on the bar in flexing a cable under tension between said jaws.

4. An instrument of the class described comprising, in combination, a pair of pivoted plier-like elements each having a jaw portion and a handle portion, one jaw having a pair of cable engaging parts spaced on opposite sides of the other jaw and cooperating therewith to flex a cable portion extending therebetween over the other jaw, and the handle portion of one element including a tension bar extending between its jaw and a hand grip, and means associated with the tension bar to indicate the flexing thereof as tension is imposed upon a cable portion stretched between said jaws.

5. An instrument of the class described comprising, in combination, a pair of pivoted plier-like elements each having a jaw portion and a handle portion, one jaw having a pair of cable engaging parts spaced on opposite sides of the other jaw and cooperating therewith to flex a cable portion extending therebetween over the other jaw, the handle portion of one element including a tension bar extending between its jaw and a hand grip mounted on the opposite end of the bar and including a pointer extending parallel to the bar and secured at one end to the jaw and having its opposite end adapted to actuate a part mounted on the handle as the tension bar is flexed, to indicate the tension imposed on the bar in flexing a cable portion under tension between the jaws.

6. An instrument of the class described comprising, in combination, a pair of pivoted plier-like elements each having a jaw portion and a handle portion, one jaw having a pair of cable engaging parts spaced on opposite sides of the other jaw and cooperating therewith to flex a cable portion extending therebetween over the other jaw, and the handle portion of one element including a tension bar extending between its jaw and a hand grip mounted on the opposite end of the bar, a scale mounted on the hand grip, a pointer extending parallel to the bar and secured at one end to the jaw and having its opposite end adapted to travel over the scale when the bar is flexed, and an indicator adapted to travel over the scale and adapted to be actuated by the pointer.

7. An instrument of the class described comprising, in combination, a pair of pivoted plier-like elements each having a jaw portion and a handle portion, one jaw having a pair of cable engaging parts spaced on opposite sides of the other jaw and cooperating therewith to flex a cable portion extending therebetween over the other jaw, and the handle portion of one element including a tension bar extending between its jaw and a hand grip mounted on the opposite end of the bar, a scale mounted on the hand grip, a pointer extending parallel to the bar and secured at one end to the jaw and having its opposite end adapted to travel over the scale when the bar is flexed, and an indicator adapted to be actuated by the pointer and to travel over the scale and supported to frictionally maintain the position to which moved with respect to the scale in the flexing of the bar.

8. An instrument of the class described comprising, in combination, a pair of pivoted plier-like elements each having a jaw portion and a handle portion, one jaw having a pair of cable engaging parts spaced on opposite sides of the other jaw and cooperating therewith to flex a cable portion extending therebetween over the other jaw, and the handle portion of one element including a tension bar extending between its jaw and a hand grip mounted on the opposite end of the bar, and means associated with the tension bar to indicate flexing of the bar upon flexing a cable portion under tension between said jaws, and means responsive to indicate flexing of a cable between said jaws regardless of the flexing of the bar.

9. An instrument of the class described comprising, in combination, a pair of handle elements pivoted together, each element having a jaw, one jaw having a pair of cable engaging parts spaced on opposite sides of the other jaw and cooperating therewith to flex a cable therebetween, the handle portion of one element including a tension bar secured at one end to the jaw of the element and having a hand grip portion mounted on its opposite end, said hand grip being provided with a scale, a pointer extending parallel to the tension bar and secured at one end to said jaw and having its opposite end adapted to travel over said scale to indicate the flexing of the bar in imposing tension on a cable stretched between said jaws, and means responsive to the flexing of a cable portion between said jaws regardless of the tension imposed upon such cable portion to indicate at a point remote from the jaws a flexing of the cable a determined distance.

GEORGE M. GRAHAM.